US009090760B2

(12) United States Patent
Chung et al.

(10) Patent No.: US 9,090,760 B2
(45) Date of Patent: *Jul. 28, 2015

(54) CONTINUOUS LATEX PRODUCTION PROCESSES

(71) Applicant: Xerox Corporation, Norwalk, CT (US)

(72) Inventors: Joo T. Chung, Webster, NY (US); Chieh-Min Cheng, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/856,568

(22) Filed: Apr. 4, 2013

(65) Prior Publication Data

US 2014/0303298 A1    Oct. 9, 2014

(51) Int. Cl.
| | |
|---|---|
| *C08K 13/02* | (2006.01) |
| *C08J 3/07* | (2006.01) |
| *B01F 7/02* | (2006.01) |
| *B01F 7/08* | (2006.01) |
| *B01F 15/06* | (2006.01) |
| *B01F 3/08* | (2006.01) |
| *G03G 9/08* | (2006.01) |
| *G03G 9/087* | (2006.01) |

(52) U.S. Cl.
CPC .............. *C08K 13/02* (2013.01); *B01F 3/0807* (2013.01); *B01F 7/022* (2013.01); *B01F 7/082* (2013.01); *B01F 7/085* (2013.01); *B01F 15/065* (2013.01); *C08J 3/07* (2013.01); *G03G 9/0804* (2013.01); *G03G 9/08755* (2013.01); *C08J 2367/00* (2013.01)

(58) Field of Classification Search
CPC ........ C08K 13/02; C08J 3/07; C08J 2367/00; B01F 7/022; B01F 7/082; B01F 7/085; B01F 15/065; B01F 3/087; B01F 2015/062; C03G 9/0804; C03G 9/08755
USPC .......... 523/161, 353; 524/247, 251, 253, 401, 524/424, 428

See application file for complete search history.

(56) References Cited

U.S. PATENT DOCUMENTS

| | | | |
|---|---|---|---|
| 7,459,258 B2 | 12/2008 | Chung et al. | |
| 7,560,505 B2 | 7/2009 | Agur et al. | |
| 8,058,335 B2 | 11/2011 | Brick et al. | |
| 8,168,699 B2 | 5/2012 | Lincoln et al. | |
| 8,207,246 B2 | 6/2012 | Faucher et al. | |
| 8,252,501 B2 | 8/2012 | Maezawa et al. | |
| 8,288,070 B2 | 10/2012 | Mizuhata et al. | |
| 8,338,071 B2 | 12/2012 | Qiu et al. | |
| 2008/0138738 A1 | 6/2008 | Chung et al. | |
| 2011/0196066 A1 | 8/2011 | Faucher et al. | |
| 2011/0286296 A1 | 11/2011 | Chung et al. | |
| 2012/0183898 A1 | 7/2012 | Faucher et al. | |
| 2014/0302432 A1* | 10/2014 | Chung et al. | .......... 430/105 |

* cited by examiner

*Primary Examiner* — Kriellion Sanders
(74) *Attorney, Agent, or Firm* — Fay Sharpe LLP

(57) ABSTRACT

Processes for continuously producing latex emulsions are disclosed. A multi-screw extruder is used for the production of the emulsion. A resin is fed into the extruder, heated, optionally dissolved in a solvent, mixed with a base to neutralize the resin and form particles, then mixed with a surfactant and water to form a phase inverted emulsion (PIE). The PIE may be sent to a distillation column to separate out the solvent, and the resulting latex emulsion is then sent to a receiving tank. These processes are useful for making precursors for toner compositions.

16 Claims, 3 Drawing Sheets

CONTINUOUS LATEX PRODUCTION PROCESSES

BACKGROUND

The present disclosure relates to continuous processes for preparing latex emulsions. These processes are useful for producing ingredients that are used in toner compositions, and can be considered to be "green" processes due to their reduced energy consumption.

Toner compositions are used with electrostatographic, electrophotographic or xerographic print or copy devices. In such devices, an imaging member or plate comprising a photoconductive insulating layer on a conductive layer is imaged by first uniformly electrostatically charging the surface of the photoconductive insulating layer. The plate is then exposed to a pattern of activating electromagnetic radiation, for example light, which selectively dissipates the charge in the illuminated areas of the photoconductive insulating layer while leaving behind an electrostatic latent image in the non-illuminated areas. This electrostatic latent image may then be developed to form a visible image by depositing finely divided electroscopic toner particles, for example from a developer composition, on the surface of the photoconductive insulating layer. The resulting visible toner image can be transferred to a suitable receiving substrate such as paper.

Processes for forming toner compositions are known. For example, emulsion/aggregation (E/A) processes involve preparing an emulsion of toner ingredients such as a surfactant, a monomer, a colorant, and a seed resin in water. The monomer is polymerized to form a latex emulsion. The emulsion is then aggregated and coalesced to obtain a slurry of toner particles. This allows the particle size, particle shape, and size distribution to be controlled. Washing of the resulting product, and then isolating the toner particles, completes the process.

Batch processes for producing the latex emulsion begin with a bulk polycondensation polymerization in a batch reactor at an elevated temperature. The time required for the polycondensation reaction is long due to heat transfer of the bulk material, high viscosity, and limitations on mass transfer. The resulting resin is then cooled, crushed, and milled prior to being dissolved into a solvent. The dissolved resin is then subjected to a phase inversion process where the resin is dispersed in an aqueous phase to prepare the latex. The solvent is then removed from the aqueous phase by a distillation method.

Batch processes generally require a long cycle time (≥25 hours) between batches. Batches are made in volumes of thousands of gallons at a time. Malfunction of the control system during a batch process can result in the entire batch not meeting specification and thus being considered waste. Also, batch processes are generally labor-intensive and require a great deal of equipment, inventory, and storage space due to their long cycle time. The use of solvents can also cause environmental concerns.

It would be desirable to provide processes that allow for the preparation of latex emulsions in a manner that is more efficient, takes less time, results in a consistent toner product, and reduces waste volumes.

BRIEF DESCRIPTION

The present disclosure relates to continuous processes for producing a latex emulsion using a multi-screw extruder. Generally, the resin is fed into the extruder, then mixed with solvent, a basic solution, water, and a surfactant at appropriate intervals in the extruder. The resulting emulsion can then be sent to a distillation column to remove solvent and obtain the latex emulsion.

Disclosed in various embodiments is a continuous process for preparing a latex emulsion, comprising: feeding a resin into a first zone of a multi-screw extruder; mixing the resin with a solvent in the first zone to dissolve the resin in the solvent and form a resin solution; adding a basic solution to the resin solution in a second zone of the extruder to form colloid particles in a slurry; adding water and a surfactant to the slurry in a third zone of the extruder to obtain a phase inverted emulsion; pumping the emulsion from an outlet port of the multi-screw extruder into a distillation column; and distilling the solvent from the emulsion to obtain the latex emulsion.

The resin may be a polyester resin. The solvent may comprise a mixture of methyl ethyl ketone and isopropanol.

The basic solution may comprise a base selected from the group consisting of ammonium hydroxide, potassium hydroxide, sodium hydroxide, sodium carbonate, sodium bicarbonate, lithium hydroxide, potassium carbonate, triethylamine, triethanolamine, pyridine and its derivatives, diphenylamine and its derivatives, poly(ethylene amine) and its derivatives, and combinations thereof.

The surfactant can be an anionic surfactant.

The resin solution may have a pH of from about 3.0 to about 4.8 in the first zone. The slurry may have a pH of from about 8 to about 12 in the second zone. The slurry may have a pH of from about 8 to about 12 in the third zone.

The local residence time in the first zone may be from about 0.5 minutes to about 1 minute. The local residence time in the second zone may be from about 0.5 minutes to about 1 minute. The local residence time in the third zone may be from about 0.5 minutes to about 3 minutes.

The temperature in the first zone may be from about 50° C. to about 110° C. The temperature in the second zone may be from about 40° C. to about 50° C. The temperature in the third zone may be from about 30° C. to about 50° C.

The screws in the extruder may rotate at a speed of about 50 rpm to about 1000 rpm. The multi-screw extruder may be a twin-screw extruder.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
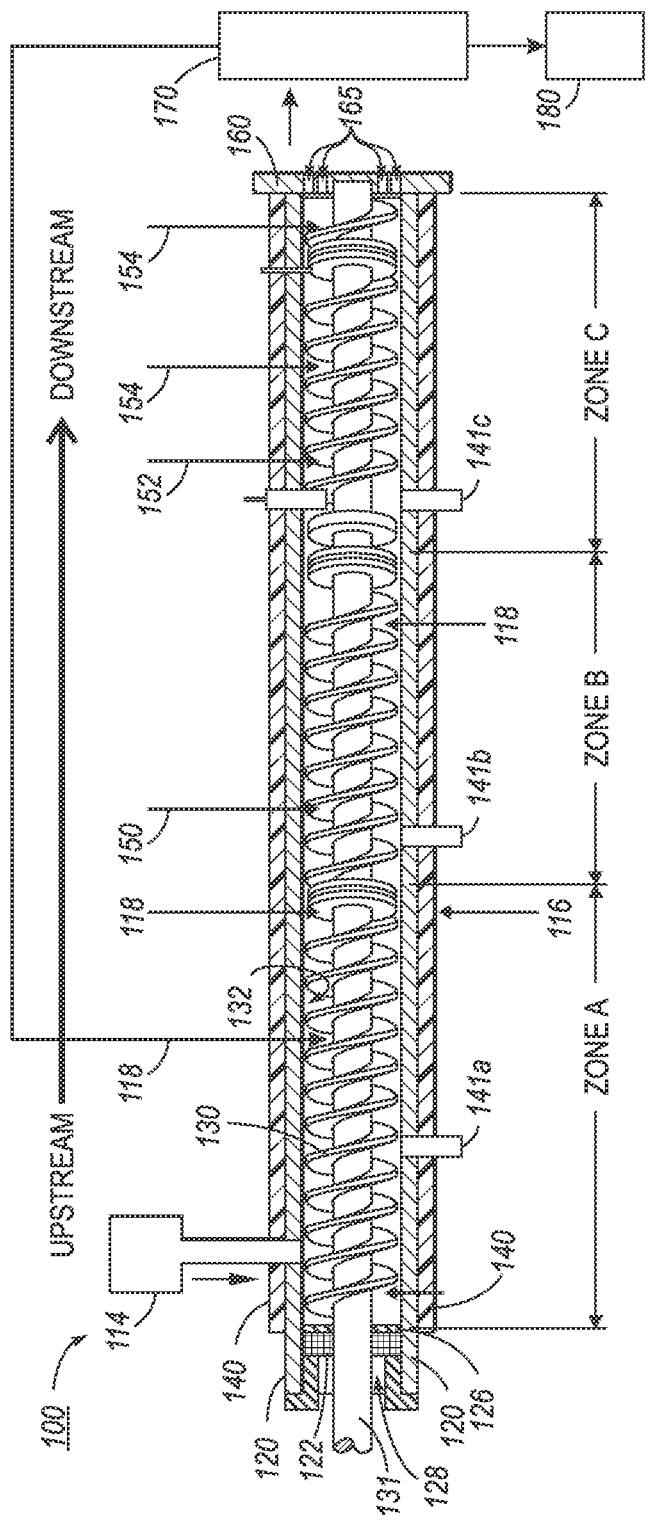
FIG. 1 is a schematic diagram showing a multi-screw extruder suitable for use in the continuous processes of the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

A value modified by a term or terms, such as "about" and "substantially," may not be limited to the precise value specified. The approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

The continuous processes disclosed herein are used to produce latex emulsions using a multi-screw extruder. The processes may use solvent, or may be solvent-free. The continuous process using a multi-screw extruder is simpler than producing such emulsions using batch processes. Many process steps can be eliminated. Because the continuous process is simpler, production costs are lower. Because smaller quantities of material are processed at a time, quality control is easier. If process controls malfunction during the continuous process, a smaller quantity of non-specification material is produced that must be discarded. Lot-to-lot variation can be reduced as well due to the control of temperature and other process parameters in small segments along the length of the extruder. In contrast, many process controls for a reaction vessel used in a batch process can only be provided along the surface of the reaction vessel. This causes significant large inhomogeneities between the material near the sides of the reaction vessel and the material in the center of the reaction vessel, such as in the temperature gradient, shear rate gradient, the velocity profile, pumping capacity, and viscosity differences. As a result, a long time period is needed for the material in the reactor vessel to be homogenized.

The Process Ingredients

The processes of the present disclosure use a multi-screw extruder, such as a twin screw extruder. During the process, many ingredients are fed into the extruder. Those ingredients include a resin (i.e. latex), a neutralizing agent (i.e. base), an emulsifying agent (i.e. surfactant), and optionally a solvent. In this section, these ingredients are described. In a later section, the processes are further described with reference to the extruder.

The latex resin is formed from a polymer. The polymer may either be fed into the extruder, or can be formed in-situ in the extruder. Any monomer suitable for preparing a latex may be used in the present particles. Suitable monomers useful in forming the latex, and thus the resulting latex particles in the latex emulsion include, but are not limited to, styrenes, acrylates, methacrylates, butadienes, isoprenes, acrylic acids, methacrylic acids, acrylonitriles, mixtures thereof, and the like. Any monomer employed may be selected depending upon the particular latex polymer to be utilized. A seed resin, which includes the latex resin to be produced, may be introduced with additional monomers to form the desired latex resin during polycondensation.

In some embodiments, the latex may include at least one polymer, including from about 1 to about 20 different polymers or from about 3 to about 10 different polymers. The polymer utilized to form the latex may be a polyester resin, including the resins described in U.S. Pat. Nos. 6,593,049 and 6,756,176, the disclosures of each of which are hereby incorporated by reference in their entirety. The latex may also include a mixture of an amorphous polyester resin and a crystalline polyester resin as described in U.S. Pat. No. 6,830,860, the disclosure of which is hereby incorporated by reference in its entirety.

In some embodiments, as described above, the resin may be a polyester resin formed by the polycondensation process of reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol and the like; alkali sulfo-aliphatic diols such as sodium 2-sulfo-1,2-ethanediol, lithium 2-sulfo-1,2-ethanediol, potassium 2-sulfo-1,2-ethanediol, sodium 2-sulfo-1,3-propanediol, lithium 2-sulfo-1,3-propanediol, potassium 2-sulfo-1,3-propanediol, mixture thereof, and the like. The aliphatic diol may be, for example, selected in an amount of from about 40 to about 60 mole percent of the resin, and the alkali sulfo-aliphatic diol may be selected in an amount of from about 1 to about 10 mole percent of the resin.

Examples of organic diacids or diesters selected for the preparation of the crystalline resins include oxalic acid, succinic acid, glutaric acid, adipic acid, suberic acid, azelaic acid, sebacic acid, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodium, lithium or potassium salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfoterephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or mixtures thereof. The organic diacid may be selected in an amount of, for example, from about 40 to about 60 mole percent of the resin, and the alkali sulfo-aliphatic diacid may be selected in an amount of from about 1 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), polypropylene-adipate), poly(butylene-adipate), poly(pentylene-adipate), poly (hexylene-adipate), poly(octylene-adipate), polyethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), alkali copoly(5-sulfoisophthaloyl)-copoly(ethylene-adipate), alkali copoly (5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly (ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly (5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly (pentylene-succinate), alkali copoly(5-sulfoisophthaloyl)-copoly(hexylene-succinate), alkali copoly(5-sulfoisophthaloyl)-copoly(octylene-succinate), alkali copoly (5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly (octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly (5-sulfo-isophthaloyl)-copoly(pentylene-adipate), alkali copoly(5-sulfo-isophthaloyl)-copoly(hexylene-adipate), poly(octylene-adipate), wherein alkali is a metal like sodium, lithium or potassium. Examples of polyamides include poly (ethylene-adipamide), poly(propylene-adipamide), poly(butylenes-adipamide), poly(pentylene-adipamide), poly(hexylene-adipamide), poly(octylene-adipamide), poly(ethylene-succinamide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 5 to about 30 percent by weight of the toner components (i.e. the slurry minus the solvent), including from about 15 to about 25 percent by weight. The crystalline resin may possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 3 to about 4.

Alternatively, the polyester resin may be an amorphous polyester. Examples of diacid or diesters selected for the preparation of amorphous polyesters include dicarboxylic acids or diesters such as terephthalic acid, phthalic acid, isophthalic acid, fumaric acid, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacid or diester may be selected, for example, from about 40 to about 60 mole percent of the resin.

Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hyroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl)oxide, dipropylene glycol, dibutylene, and combinations thereof. The amount of organic diol selected may vary, and may be, for example, from about 40 to about 60 mole percent of the resin.

Examples of other amorphous resins which may be utilized include poly(styrene-acrylate) resins, crosslinked, for example, from about 25 percent to about 70 percent, poly (styrene-acrylate) resins, poly(styrene-methacrylate) resins, crosslinked poly(styrene-methacrylate) resins, poly(styrene-butadiene) resins, crosslinked poly(styrene-butadiene) resins, alkali sulfonated-polyester resins, branched alkali sulfonated-polyester resins, alkali sulfonated-polyimide resins, branched alkali sulfonated-polyimide resins, alkali sulfonated poly(styrene-acrylate) resins, crosslinked alkali sulfonated polystyrene-acrylate) resins, poly(styrene-methacrylate) resins, crosslinked alkali sulfonated-poly(styrene-methacrylate) resins, alkali sulfonated-poly(styrene-butadiene) resins, and crosslinked alkali sulfonated poly (styrene-butadiene) resins. Alkali sulfonated polyester resins may be useful in embodiments, such as the metal or alkali salts of copoly(ethylene-terephthalate)-copoly(ethylene-5-sulfo-isophthalate), copoly(propylene-terephthalate)-copoly (propylene-5-sulfo-isophthalate), copoly(diethylene-terephthalate)-copoly(diethylene-5-sulfo-isophthalate), copoly (propylene-diethylene-terephthalate)-copoly(propylene-diethylene-5-sulfoisophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), and wherein the alkali metal is, for example, a sodium, lithium or potassium ion.

Other examples of suitable latex resins or polymers which may be produced include, but are not limited to, poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), polystyrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), and poly(styrene-butyl acrylate-acrylonitrile-acrylic acid), and combinations thereof. The polymer may be block, random, or alternating copolymers.

In addition, polyester resins obtained from the reaction of bisphenol A and propylene oxide or propylene carbonate, and in particular including such polyesters followed by the reaction of the resulting product with fumaric acid (as disclosed in U.S. Pat. No. 5,227,460, the disclosure of which is hereby incorporated by reference in its entirety), and branched polyester resins resulting from the reaction of dimethylterephthalate with 1,3-butanediol, 1,2-propanediol, and pentaerythritol may also be used.

The molecular weight of the latex correlates to the melt viscosity or acid value of the material. The weight average molecular weight (Mw) and molecular weight distribution (MWD) of the latex may be measured by Gel Permeation Chromatography (GPC). The molecular weight may be from about 3,000 g/mole to about 150,000 g/mole, including from about 8,000 g/mole to about 100,000 g/mole, and in more particular embodiments from about 10,000 g/mole to about 90,000 g/mole.

The resulting latex may have acid groups at the terminal of the resin. Acid groups which may be present include carboxylic acids, carboxylic anhydrides, carboxylic acid salts, combinations thereof, and the like. The number of carboxylic acid groups may be controlled by adjusting the starting materials and reaction conditions to obtain a resin that possesses excellent emulsion characteristics and a resulting toner that is environmentally durable.

Those acid groups may be partially neutralized by the introduction of a neutralizing agent, in embodiments a basic solution, during neutralization (which occurs prior to emulsification). Suitable bases which may be utilized for this neutralization include, but are not limited to, ammonium hydroxide, potassium hydroxide, sodium hydroxide, sodium carbonate, sodium bicarbonate, lithium hydroxide, potassium carbonate, triethylamine, triethanolamine, pyridine and its derivatives, diphenylamine and its derivatives, poly(ethylene amine) and its derivatives, combinations thereof, and the like. After neutralization, the hydrophilicity, and thus the emulsifiability of the resin, may be improved when compared with a resin that did not undergo such neutralization process. The resulting partially neutralized melt resin may be at a pH of from about 8 to about 13, in embodiments from about 11 to about 12.

The emulsifying agent may include any surfactant suitable for use in forming a latex resin. Surfactants which may be utilized during the emulsification stage in preparing latexes with the processes of the present disclosure include anionic, cationic, and/or nonionic surfactants. Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid, combinations thereof, and the like. Other suitable anionic surfactants include, in embodiments, DOWFAX® 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be used.

Examples of nonionic surfactants include, but are not limited to alcohols, acids and ethers, for example, polyvinyl alcohol, polyacrylic acid, methalose, methyl cellulose, ethyl cellulose, propyl cellulose, hydroxylethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, mixtures thereof, and the like.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, and C12, C15, C17 trimethyl ammonium bromides, mixtures thereof, and the like. Other cationic surfactants include cetyl pyridinium bromide, halide salts of quaternized polyoxyethylalkylamines, dodecylbenzyl triethyl ammonium chloride, and the like, and mixtures thereof. The choice of particular surfactants or combinations thereof as well as the amounts of each to be used are within the purview of those skilled in the art.

If desired, a solvent may be added to the extruder and mixed with the polymer resin to dissolve/soften the resin and break down macromolecules into molecules for emulsification. The softened resin may be sufficiently viscous so as to not be free-flowing at room temperature, but sufficiently pliable to be mixed by the extruder. The complex viscosity of the softened resin, sometimes referred to as a pre-blend mixture, may be from about 10 Pa-sec to about 1,000 Pa-sec at about 130° C., including from about 50 Pa-sec to about 500 Pa-sec. The complex viscosity of the resin pre-blend mixture can be measured using a rheometer.

The solvent may be an organic solvent, including for example alcohols, ketones, amides, nitriles, ethers, sulfones, sulfoxides, amines, combinations thereof, and the like. The solvent may be present in an amount of from about 5% by weight to about 100% by weight of the resin, including from about 10% by weight to about 50% by weight of the resin.

Exemplary organic solvents include alcohols, such as methanol, ethanol, isopropanol, butanol, as well as higher homologs and polyols, such as ethylene glycol, glycerol, sorbitol, and the like; ketones, such as acetone, 2-butanone, 2-pentanone, 3-pentanone, methyl ethyl ketone, ethyl isopropyl ketone, methyl isobutyl ketone, diisobutyl ketone, and the like; amides, such as dimethylformamide, dimethylacetamide, N-methylpyrrolidone, 1,2-dimethyl-2-imidazolidinone, and the like; nitriles, such as acetonitrile, propionitrile, butyronitrile, isobutyronitrile, valeronitrile, benzonitrile, and the like; ethers, such as ditertbutyl ether, dimethoxyethane, 2-methoxyethyl ether, 1,4-dioxane, tetrahydrohyran, morpholine, and the like; sulfones, such as methylsulfonylmethane, sulfolane, and the like; sulfoxides, such as dimethylsulfoxide; phosphoramides, such as hexamethylphosphoramide; benzene and benzene derivatives; as well as esters, amines and combinations thereof.

In particular embodiments, the solvents may be selected from the group consisting of methyl ethyl ketone (MEK), isopropanol (IPA), methanol, ethanol, 1-butanol, 2-butanol, isobutanol, tert-butanol, and mixtures thereof. In more specific embodiments, the solvent is a combination of methyl ethyl ketone (MEK) and isopropanol (IPA). The volume ratio of MEK to IPA may be from about 3:1 to about 5:1 (v/v), or more specifically 4.285:1.

In other embodiments, the organic solvent may be water-immiscible. The organic solvent may have a boiling point of from about 30° C. to about 100° C. Any suitable organic solvent noted hereinabove may also be used as a solvent base phase inversion agent, and may be used in an amount of from about 1% by weight to about 25% by weight of the resin, in embodiments from about 5% by weight to about 20% by weight of the resin.

Continuous Emulsification Process

Two exemplary embodiments of the continuous processes of the present disclosure are described herein. In one exemplary embodiment, the processes include the addition of solvent. In the other exemplary embodiment, the process is solvent-free.

The continuous processes occur within a multi-screw extruder. A multi-screw extruder includes a segmented barrel and at least two screw elements extending lengthwise through the barrel. Each segment of the barrel can be heated and controlled at a set temperature independently of the other barrel segments, and functions as a continuous reactor. The screw elements in each segment can also be varied for the particular application. The local residence time in each segment can be lengthened or shortened, the mixing intensity can be adjusted, and the shear stress and shear rate profiles can be optimized through screw design. The local pressure and volume can also be changed within each segment of the barrel through screw design. The screw speed and particle slurry feed rate can be controlled during the continuous process. Such an extruder permits many different applications, such as melt-mix, distributive mixing, dispersive mixing, dissipative missing, and chaotic mixing.

Referring now to FIG. 1, the multi-screw extruder 100 of the first exemplary embodiment (using a solvent) includes an extruder barrel 120, at least two screws 130, a screw extruder channel 132, a heater 140, thermocouple 141, a resin feeder 114, a solvent supply port 118, a neutralizing agent supply port 150, a surfactant supply port 152, and a water supply port 154. Each screw 130 is driven by a shaft 131 which is connected to a drive motor (not shown) in a conventional manner that allows for rotation of screw 130 at speeds of from about 50 rotations per minute ("rpm") to about 1000 rpm, or in more specific embodiments from about 250 rpm to about 750 rpm. Each shaft 131 passes through liquid seal housing 128, blister ring 122, and seal pack 126, which seals the upstream end of barrel 120.

The screw extruder 100 is divided into three zones; namely Zone A (first zone) where the resin and solvent are fed into the extruder and mixed, Zone B (second zone) where colloid particles are formed, and Zone C (third zone) where the colloid particles are dispersed and a phase inverted emulsion (PIE) is formed. Zone A is upstream of Zone B, which is upstream of Zone C. As previously mentioned, the barrel is separated into segments; each zone includes at least one segment, and may include a plurality of segments. Each zone includes a thermocouple 141a, 141b, 141c for monitoring and controlling the temperature of the zone. Material moves from the upstream end of the extruder 100 in the downstream direction sequentially through Zones A, B and C, eventually exiting the extruder 100 through openings 165 of head 160.

The resin feeder 114 and the solvent supply port 118 are located in Zone A. The neutralizing agent supply port 150 is located in Zone B. The surfactant supply port 152 and the water supply port 154 are located in Zone C.

Each screw 130 can be modular in construction in the form of pieces of conveying elements, enabling the screw to be configured with different conveying elements and kneading elements having the appropriate lengths, pitch angles, and the like, in such a way as to provide optimum conveying, mixing, dispersing, devolatilizing, discharging, and pumping conditions. For example, each conveying element may have a length of from about 1350 mm to about 3000 mm, and a pitch angle of from about 0° to about 90°. In more particular embodiments, each conveying element has a length from about 1500 mm to about 2500 mm, and a pitch angle of from about 20° to about 75°. Kneading elements may be affixed to the screw, or the kneading elements may be integral thereto and project therefrom. Kneading elements may have any suitable shape, size, and configuration, including right and left hand kneading elements and neutral kneading elements with the helix angle of the kneading elements being from about 45° to about 90°, combinations thereof, and the like. The kneading elements may be forward, neutral, and/or reverse kneading elements. Put another way, they may push the resin through the extruder toward the outlet port (forward), back through the extruder toward the inlet port (reverse) to lengthen the residence time and mixing, or they may knead the resin without actively forwarding or reversing the components through the extruder (neutral).

Figure 2:
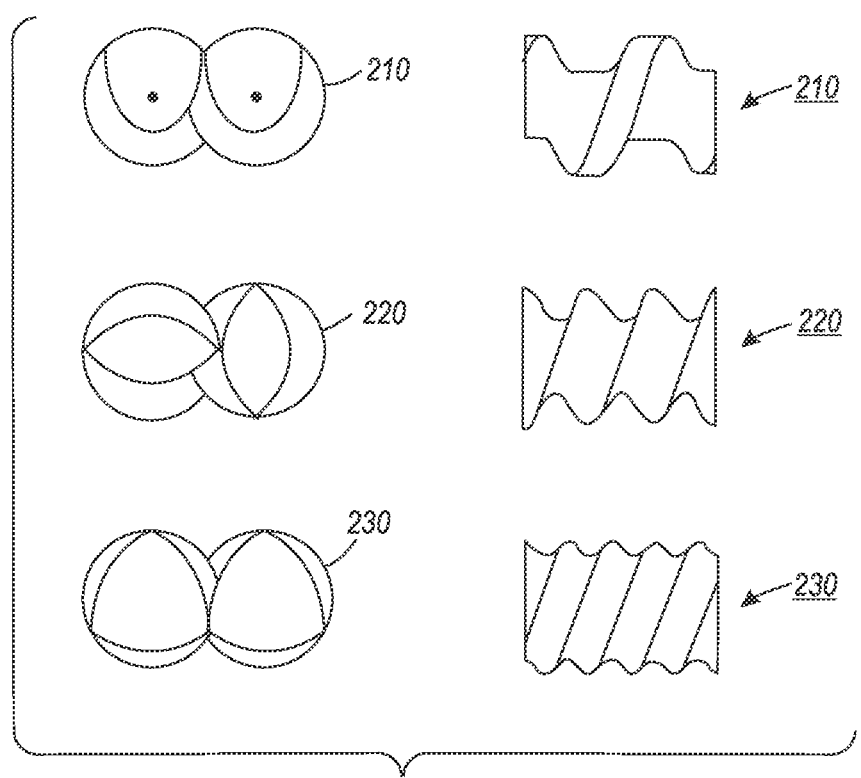
FIG. 2 provides axial and profile views illustrating the differences between single-lobe, two-lobe, and three-lobe screws.

FIG. 2 provides an axial view (on the left) and a profile view (on the right) for three different types of conveying/kneading elements that can be used in a multi-screw extruder. Illustrated here are a single lobe screw 210, a two-lobe screw 220, and a three-lobe screw 230. As the number of lobes increases, the element generates higher shear and shear stress, as well as increasing residence time of the material in the system for a given screw speed and set of process conditions. A three-lobe screw generates higher viscous dissipation heat due to high shear stress and shear rate, and is more effective for a dissipative melt mixing in the segment in which it is used. A three-lobe screw has less free volume and results in lower throughput, which in turn, lowers productivity compared to a two-lobe screw. Thus, a two-lobe screw has higher free volume and increases productivity. A two-lobe screw may also effectively be used as an equivalent to the three-lobe screw by changing the process conditions without jeopardizing productivity.

The local residence time in each of Zones A, B and C can be controlled by screw design, screw speed, feed rates, temperature and pressure. The local residence time suitable for the continuous processes will vary depending on a number of factors including, for example, the particular latex employed, the temperature within the zone, the length of the zone, etc. The screw extruder should be designed to provide local residence times of from about 0.5 minutes to about 1 minute in Zone A; from about 0.5 minutes to about 1 minute in Zone B; and from about 0.5 minutes to about 3 minutes in Zone C. In embodiments, the total residence time of the slurry within the multi-screw extruder is from about 2 minutes to about 4 minutes.

Initially, the resin is fed into the barrel 120 of the extruder into the first zone (Zone A) via the resin feeder. The resin can be fed into the barrel at a controlled volumetric rate of 1 to 20 kg/hour, or at a pressure of from about 5 psi to about 100 psi. At least one solvent is also introduced into the first zone via the solvent supply port 118. As depicted here, two solvent supply ports 118 are provided.

In Zone A, the resin is melt-mixed with the solvent to dissolve the resin into the solvent and form a resin solution. The temperature should be at least about 20° C. higher than the melting point of the resin. In more narrow embodiments, the temperature range is from about 50° C. to about 90° C. or from about 90° C. to about 110° C. The resin undergoes dissipative mixing under high shear and stress (i.e. melt-mixing). The weight ratio of the resin to the solvent is from about 1:1 to about 3:1, or more particularly about 2.22:1.

When being fed into Zone A, the resin is generally provided as solid particles. The resin solution has a pH of from about 3.0 to about 4.8. Once the resin is completely dissolved, the resin solution moves into Zone B.

In Zone B, a caustic (i.e. basic) solution is added to the resin solution via neutralizing agent supply port 150 to raise the pH to a range of about 8 to about 12. The temperature in Zone B is lowered to a range of from about 40° C. to about 50° C. As a result of mixing in Zone B in the elevated pH, the resin-solvent system is neutralized to form a slurry of stable colloid particles. The slurry is processed to obtain a colloidal particle slurry having a desired particle size distribution, as measured using the geometric standard deviation (GSD), and the desired degree of circularity. Here, the screws of the extruder can be configured to have right hand and neutral kneading elements. A left hand kneading element can be placed at the downstream end of Zone B to increase local residence time.

The colloidal slurry exits Zone B and flows into Zone C. In Zone C, water and a surfactant are added to the slurry to obtain a phase inverted emulsion. The disperse phase includes droplets of the resin, and the continuous phase includes the water, solvent, and surfactant. Water supply port and surfactant supply port are depicted here. However, it should be noted that the surfactant can be dissolved in water and both ingredients supplied through a common port as well. Alternatively, multiple supply ports are spaced along the length of Zone C, with both ingredients being supplied through these ports as well. Zone C can be maintained at the same pH range as Zone B. The temperature in Zone C may be in the range of from about 30° C. to about 50° C. depending on the resin. The emulsion may have a solids content of from about 5 wt % to about 50 wt %. The desired amount of time for emulsification may be obtained by modifying the screw speed rate, the barrel temperature, and the feed rate of the resin into screw extruder.

The phase inverted emulsion (PIE) is then pumped from Zone C of the screw extruder and exits the extruder through the openings 165 at the head 160 of the extruder. A positive displacement pump, such as a gear pump, can be used for this purpose to control the pump rate and regulate the back pressure.

The phase inverted emulsion is pumped from the screw extruder 100 into a distillation column 170. The pumping rate to the distillation column can be limited and constant due to the resin feed rate (in Zone A). In the distillation column, the majority of the solvent (as measured by volume) is removed from the emulsion. MEK and IPA each form an azeotrope with water, and can be separated at temperatures below 50° C., which is below the glass transition temperature of a polyester resin (i.e. the colloidal particles). These solvents can be further separated from water using other techniques. The recovered solvent can be recycled back to the extruder (line 172). The latex emulsion is sent to a receiving tank 180.

The resulting latex emulsion contains colloidal particles in water. The colloidal latex particles slurry may have a GSDv and/or a GSDn of about 1.1 to about 1.2. The GSDv refers to the upper geometric standard deviation (GSDv) by volume (coarse level) for ($D_{84}/D_{50}$). The GSDn refers to the geometric standard deviation (GSDn) by number (fines level) for ($D_{50}/D_{16}$). The particle diameters at which a cumulative percentage of 50% of the total toner particles are attained are defined as volume D50, and the particle diameters at which a cumulative percentage of 84% are attained are defined as volume D84. These aforementioned volume average particle size distribution indexes GSDv can be expressed by using D50 and D84 in cumulative distribution, wherein the volume average particle size distribution index GSDv is expressed as (volume D84/volume D50). These aforementioned number average particle size distribution indexes GSDn can be expressed by using D50 and D16 in cumulative distribution, wherein the number average particle size distribution index GSDn is expressed as (number D50/number D16). The closer to 1.0 that the GSD value is, the less size dispersion there is among the particles. Desirably, the particles have a D50 of less than 100 nanometers, e.g. a D50 of from about 40 nanometers up to 100 nanometers.

The Microtrac Nanotrac instrument can be used to determine the particle size distribution of suspended particles. The size distribution measurement is accomplished by using a laser light-scattering technique, which allows for the measurement of the Doppler-shifted light generated from each particle in motion (Brownian Motion). The signals generated by these shifts are proportional to the size of the particle. These signals are then captured and mathematically converted to obtain the particle size distribution.

The latex particles may have a circularity of from about 0.93 to about 0.95. The circularity is a measure of the particles' closeness to perfectly spherical. A circularity of 1.0 identifies a particle having the shape of a perfect circular sphere. The volume average circularity may be measured though Flow Particle Image Analysis (FPIA), provided for example by the Sysmex® Flow Particle Image Analyzer, commercially available from Sysmex Corporation.

The final latex emulsion contains from about 30 wt % to about 50 wt % of solids, and contains from about 50 wt % to about 70 wt % of water. The latex emulsion has a final pH of from about 6.2 to about 7.2.

One advantage of using solvents to dissolve the resin is that a lower specific power is needed for mixing and emulsification. For example, a solvent-free emulsification may use a specific power of 0.16 kW/lb, while the use of solvent lowers this specific power to a value of 0.1 kW/lb. However, the specific power needed can also be adjusted by other process conditions and the screw design.

Figure 3:
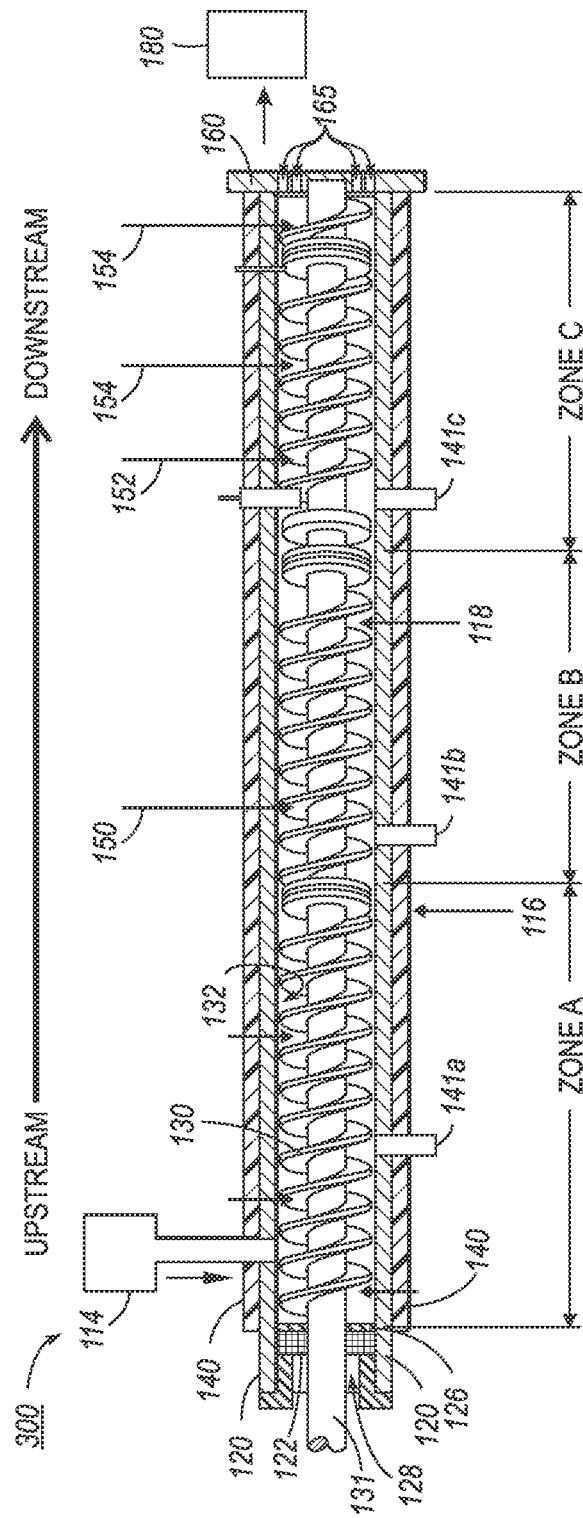
FIG. 3 is a schematic diagram showing another multi-screw extruder used in a solvent-free process for comparison with the continuous processes of the present disclosure.

FIG. 3 illustrates an extruder that is useful for a solvent-free process, and is provided for comparison purposes. This multi-screw extruder 300 is similar to the embodiment shown in FIG. 1, but does not include a solvent supply port 118 in Zone A. In addition, no distillation column is present. Instead, the phase inverted emulsion (PIE) is pumped from Zone C of the screw extruder into the receiving tank 180.

Here, the resin is melt-mixed in Zone A along with a base. In Zone B, the surfactant is added to the resin as a neutralizing agent (although neutralization does not take place yet). In Zone C, water is added to the melt-mixed resin solution. Here, the resin-solvent system is neutralized to form a slurry of stable colloid particles. Due to the lack of solvent (i.e. MEK or IPA) here, no distillation column is needed.

The phase inverted emulsion (PIE) is then pumped from Zone C of the screw extruder and exits the extruder through the openings 165 at the head 160 of the extruder. A positive displacement pump, such as a gear pump, can be used for this purpose to control the pump rate and regulate the back pressure. The PIE is pumped to the receiving tank 180.

The continuous latex emulsion production processes of the present disclosure minimize vulnerability of the process to control system malfunctions and reduces waste. If a malfunction occurs, only a small amount of slurry/emulsion must be discarded, rather than thousands of gallons as in batch processes. Only the non-specification slurry/emulsion needs to be purged. The extruder can be easily cleaned, and the rest of the system can continue. This results in decreased cycle time, increased productivity, and reduced cost. Consistency between production lots is also increased. The process is less labor-intensive and uses less equipment. The latex emulsion can be produced in a just-in-time manner, which minimizes inventory and storage space as well. In addition, the continuous processes disclosed herein are volumetrically more efficient than a batch process, requiring a smaller operating footprint for an equivalent operating rate.

The following examples are for purposes of further illustrating the present disclosure. The examples are merely illustrative and are not intended to limit the disclosure to the materials, conditions, or process parameters set forth therein.

EXAMPLE

A continuous latex production process using a twin-screw extruder and including a solvent was performed. The ingredients and their final amounts are listed below in Table 1.

TABLE 1

| Component | Description | Amount (%) | Feed Rate (g/min) |
| --- | --- | --- | --- |
| FXC56 | Polyester resin | 30.81 | 121.21 |
| MEK | Solvent | 11.27 | 44.33 |
| IPA | Solvent | 2.63 | 10.35 |
| NaOH | Base | 0.19 | 0.74 |
| Dowfax ® surfactant | Surfactant | 0.29 | 1.15 |
| Deionized water | Water | 54.56 | 213.51 |

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A continuous process for preparing a latex emulsion, comprising:
feeding a resin into a first zone of a multi-screw extruder;
mixing the resin with a solvent in the first zone to dissolve the resin in the solvent and form a resin solution;
adding a basic solution to the resin solution in a second zone of the extruder to form colloid particles in a slurry;
adding water and a surfactant to the slurry in a third zone of the extruder to obtain a phase inverted emulsion;
pumping the emulsion from an outlet port of the multi-screw extruder into a distillation column; and
distilling the solvent from the emulsion to obtain the latex emulsion.

2. The process of claim 1, wherein the resin is a polyester resin.

3. The process of claim 1, wherein the solvent comprises a mixture of methyl ethyl ketone and isopropanol.

4. The process of claim 1, wherein the basic solution comprises a base selected from the group consisting of ammonium hydroxide, potassium hydroxide, sodium hydroxide, sodium carbonate, sodium bicarbonate, lithium hydroxide, potassium carbonate, triethylamine, triethanolamine, pyridine and its derivatives, diphenylamine and its derivatives, polyethylene amine) and its derivatives, and combinations thereof.

5. The process of claim 1, wherein the surfactant is an anionic surfactant.

6. The process of claim 1, wherein the resin solution has a pH of from about 3.0 to about 4.8 in the first zone.

7. The process of claim 1, wherein the slurry has a pH of from about 8 to about 12 in the second zone.

8. The process of claim 1, wherein the slurry has a pH of from about 8 to about 12 in the third zone.

9. The process of claim 1, wherein the local residence time in the first zone is from about 0.5 minutes to about 1 minute.

10. The process of claim 1, wherein the local residence time in the second zone is from about 0.5 minutes to about 1 minute.

11. The process of claim 1, wherein the local residence time in the third zone is from about 0.5 minutes to about 3 minutes.

12. The process of claim 1, wherein the temperature in the first zone is from about 50° C. to about 110° C.

13. The process of claim 1, wherein the temperature in the second zone is from about 40° C. to about 50° C.

14. The process of claim 1, wherein the temperature in the third zone is from about 30° C. to about 50° C.

15. The process of claim 1, wherein screws in the extruder rotate at a speed of about 50 rpm to about 1000 rpm.

16. The process of claim 1, wherein the multi-screw extruder is a twin-screw extruder.

* * * * *